(12) United States Patent
Tang et al.

(10) Patent No.: US 10,313,244 B2
(45) Date of Patent: Jun. 4, 2019

(54) CONGESTION CONTROL WITHIN A COMMUNICATION NETWORK

(71) Applicant: Alcatel Lucent, Boulogne-Billancourt (FR)

(72) Inventors: Siyu Tang, Prinsenbeek (NL); Danny De Vleeschauwer, Evergem (BE)

(73) Assignee: ALCATEL LUCENT, Boulogne-Billancourt (FR)

( * ) Notice: Subject to any disclaimer, the term of this patent is extended or adjusted under 35 U.S.C. 154(b) by 12 days.

(21) Appl. No.: 15/639,081

(22) Filed: Jun. 30, 2017

(65) Prior Publication Data

US 2018/0013677 A1 Jan. 11, 2018

(30) Foreign Application Priority Data

Jul. 6, 2016 (EP) .................................. 16290131

(51) Int. Cl.
*H04L 12/803* (2013.01)
*H04L 12/801* (2013.01)
*H04L 12/26* (2006.01)
*H04L 12/825* (2013.01)

(52) U.S. Cl.
CPC .......... *H04L 47/122* (2013.01); *H04L 43/062* (2013.01); *H04L 43/0882* (2013.01); *H04L 43/12* (2013.01); *H04L 47/10* (2013.01); *H04L 47/11* (2013.01); *H04L 47/12* (2013.01); *H04L 47/263* (2013.01); *H04L 47/125* (2013.01)

(58) Field of Classification Search
CPC ..... H04L 47/122; H04L 47/11; H04L 47/263; H04L 47/10; H04L 47/12; H04L 47/125; H04L 43/12; H04L 43/0882; H04L 43/062

See application file for complete search history.

(56) References Cited

U.S. PATENT DOCUMENTS

| | | | |
|---|---|---|---|
| 2002/0150048 A1* | 10/2002 | Ha | H04L 1/1887 370/231 |
| 2007/0076598 A1* | 4/2007 | Atkinson | H04L 47/10 370/229 |
| 2011/0170408 A1 | 7/2011 | Furbeck et al. | |
| 2011/0261696 A1 | 10/2011 | Crisan et al. | |

(Continued)

FOREIGN PATENT DOCUMENTS

| | | |
|---|---|---|
| EP | 2110992 A1 | 10/2009 |
| EP | 2869517 A1 | 5/2015 |
| GB | 2378613 A | 2/2003 |

OTHER PUBLICATIONS

European Search Report for European Patent Application No. 16290131 dated Jan. 5, 2017.

(Continued)

*Primary Examiner* — Feben Haile (74) *Attorney, Agent, or Firm* — Harness, Dickey & Pierce, P.L.C.

(57) ABSTRACT

According to an embodiment a packet forwarding device is disclosed for forwarding data packets on a link within a communication network. The packet forwarding device is further configured to perform the following steps: measuring a load of the link; detecting if the load exceeds one of a plurality of threshold indicative for a level of congestion on the link; and sending a signal to another device in the communication network signalling the level of congestion.

12 Claims, 6 Drawing Sheets

(56) References Cited

U.S. PATENT DOCUMENTS

2011/0270972 A1* 11/2011 Mukherjee .......... H04L 41/0833
　　　　　　　　　　　　　　　　　　　709/224
2013/0298235 A1* 11/2013 Smith ................. H04L 63/0414
　　　　　　　　　　　　　　　　　　　726/23

OTHER PUBLICATIONS

Office Action for corresponding European Application No. 16290131.8 dated Mar. 18, 2019.

* cited by examiner

CONGESTION CONTROL WITHIN A COMMUNICATION NETWORK

CROSS-REFERENCE TO RELATED APPLICATIONS

This application claims under 35 U.S.C. § 119 priority to European Patent Application No. 16290131.8 filed on Jul. 6, 2016, in the European Patent Office, the disclosure of which is incorporated herein in its entirety by reference.

TECHNICAL FIELD

The present disclosure relates to the field of congestion control on a link within communication network. Congestion control may be performed by packet forwarding devices on this link. Examples of such devices are switches, routers and gateways.

Within such devices the packets are temporarily buffered before they are forwarded. Which packets are forwarded in which order is determined according to a certain forwarding policy by the packet forwarding device.

The packet forwarding device further exchanges information with an endpoint on the link that adapts its transmission of packets accordingly.

BACKGROUND

The type of applications running over the Internet has become quite diverse nowadays. Each type of application requires different approaches regarding the delivery of data packets, i.e. the data packets must be delivered before a certain deadline. Throughput-oriented applications for example aim to optimize the throughput of data packets aiming at a high-throughput. Latency-sensitive applications on the contrary aim to minimize the latency in order to achieve a zero queuing delay. Note however it is unavoidable that a trade-off needs to be made between zero-queuing delay and high-throughput.

Current window-based schemes are devoted to reduce queue oscillations caused by the transmission control protocol (TCP) or one of its variants, leading to so-called active queue management (AQM) schemes. These AQM schemes are however stochastic, resulting in a stochastic congestion window. Hence, either queue oscillations will remain resulting in queues that are empty for a large portion of time or uncontrolled queue oscillations occur leading to unpredictable delays. As a result the efficiency of forwarding packets on a link within a communication network is reduced drastically.

An approach to improve the efficiency through minimizing the latency is to signal the endpoint device about a congestion before a link is fully utilized. Moreover, in order to lift the efficiency even more, a fraction of the capacity of the link can be sacrificed such that oscillations can be absorbed better. This approach is applied by the High-bandwidth Ultra-Low Latency (HULL) architecture which is an extension of a Data Centre Transmission Control Protocol (DCTCP). This architecture modifies the legacy window-based protocol via spacing data packets at an endpoint and by signalling congestion before a link is fully utilized.

SUMMARY

It is however a drawback that the aforementioned AQM scheme uses a pre-defined fixed portion of the capacity sacrificed to absorb oscillations. This leads to a fixed sacrificed bandwidth that is unsuitable to absorb oscillations if the number of data packets that needs to be forwarded increases. This may be solved by sacrificing a bigger portion of the capacity yet this leads on his turn to a decrease in efficiency.

This fixed bandwidth corresponds to a threshold such that the data rate of data packets is compared with this threshold. If this threshold is exceeded, packets are dropped or marked in order to avoid congestion.

It is therefore an objective to disclose a device and the related method that overcomes the above identified shortcomings of existing solutions. More particularly, it is an objective to provide a solution for congestion control that does not suffer from excessive throughput oscillation or sacrifices part of the bandwidth.

According to a first aspect of the present disclosure, the above defined objectives are realized by a packet forwarding device for forwarding packets on a link within a communication network, the device comprising:

a) a network monitor module configured to measure a load indicative for a congestion of the link; and b) a congestion detection module configured to detect when the load exceeds one of a plurality of thresholds each threshold indicative for a level of congestion on the link; and c) a congestion control module configured to send a signal to another device in the network signalling the level of congestion.

The packet forwarding device in the communication network receives data packets and will forward these data packets as a whole or in parts on a link. In order to do so, firstly, a network monitor module will actively measure the load of the link in order to have an indication of the congestion on this link. Next, when this measured load exceeds one of a plurality of thresholds a congestion detection module detects a level of congestion. Note that the aforementioned thresholds are indicative for a level of congestion on the link. Subsequently, a congestion control module will send a signal to another device in the communication network signaling the level of congestion.

It is an advantage to measure the load of the link instead of observing the queue since therefore an indication of the congestion on the link is obtained, even before queues are built-up. With known techniques, such as observing the queue occupancy, a small amount of delays will be accumulated, which prevents zero queuing delay. Furthermore, since a plurality of thresholds is used, a classification of types of congestion may be made each expressing a level of congestion. Consequently, by sending a signal based on the level of congestion to another device in the communication network, that device is notified about this level of congestion. Since the other device in the network is aware of the level of congestion of the link, it is an advantage that a more appropriate approach to utilise the link in an optimal manner may be pursued. This means that a better decision regarding the trade-off between zero-queuing delay and high-throughput may be made. In other words, different levels of congestion may be defined such that an endpoint device can proactively foresee when congestion will occur and incrementally adapt its flow control scheme. By such incremental adaptation, oscillations are prevented. Moreover, because of the different levels of congestion, there is no need for foreseeing further bandwidth margins because the endpoint may already anticipate the congestion at an earlier state.

According to an embodiment, the load is the ratio of received packets for forwarding on the link over the maximum packets that the link can handle.

Since the maximum packets that the link can handle is taken into account in the definition of the load a dimensionless quantity is obtained. Not only is an indication obtained about whether congestion occurs but also about the degree of congestion. Using such a dimensionless quantity is an advantage because it facilitates the implementation when it is exchanged with other modules.

According to an embodiment, the network monitor device is configured to measure the received packets according to an exponential weighted moving average.

The advantage of using an exponential weighted moving average in order to average the measurement is that short-term fluctuations are smoothed out and longer-term trends are highlighted, resulting in a better estimations of the number of packets that are received.

According to an embodiment, the congestion detection module is further adapted to change the thresholds dependent on the network conditions.

Since the network conditions are dynamically changing, it is an advantage that the thresholds are not fixed but may be adapted by the congestion detection module.

According to an embodiment, the signal is embedded in a header field of the packets.

Hence, the packets that are forwarded also contains the signal with information of the level of congestion. In doing so, it is an advantage signals do not need to be sent separately.

According to an embodiment, the header field corresponds to an explicit congestion notification (ECN) field of an Internet Protocol header.

ECN allows end-to-end notification without dropping packets and is an optional feature usable between two ECN-enabled endpoints. Furthermore, ECN is an extension to the Internet Protocol (IP) and to the Transmission Control Protocol (TCP) which makes it advantageous to use it since it facilitates the implementation as well as the exchange with other devices.

According to a second aspect, the disclosure relates to a networking endpoint comprising a source congestion control module configured to adapt a transmission of packets on a link according to a congestion signal received from a forwarding network device on the link; and wherein the congestion signal comprises an indication of a congestion level selected from a plurality of congestion levels; and wherein the congestion control module is further configured to:

when no congestion signal is received, probing an available bandwidth according to a first probing scheme; and when the congestion level corresponds to a first low level of congestion, probing the available bandwidth according to a second probing scheme; and wherein the second probing scheme is less aggressive than the first probing scheme; and when the congestion signal corresponds to a second high level of congestion, probing the available bandwidth according to a third probing scheme; and wherein the third probing scheme is a back-off probing scheme.

As a plurality of congestion levels is available, a trade-off between smoothness and convergence is achieved. Because of this, the endpoint can adapt its aggressiveness during bandwidth probing based on the type of congestion signals being received. This way, oscillations in the transmission rate are avoided while the convergence in transmission rate is fast.

According to an embodiment, the congestion control module further operates according to a window-based probing scheme or a rate-based probing scheme.

According to a third aspect; the disclosure relates to a system comprising the networking endpoint according to the second aspect and the packet forwarding device according to the first aspect.

According to a fourth aspect; the disclosure relates to a method for adapting a transmission of packets on a link in a networking endpoint comprising the following steps:

receiving a congestion signal from a forwarding network device on the link; and wherein the congestion signal comprises an indication of a congestion level selected from a plurality of congestion levels; and when no congestion signal is received, probing an available bandwidth according to a first probing scheme; and when the congestion level corresponds to a first low level of congestion, probing the available bandwidth according to a second probing scheme; and wherein the second probing scheme is less aggressive than the first probing scheme; and when the congestion signal corresponds to a second high level of congestion, probing the available bandwidth according to a third probing scheme; and wherein the third probing scheme is a back-off probing scheme.

According to a fifth aspect, the disclosure relates to a method for forwarding packets on a link within a communication network, the method comprising:

a) measuring a load indicative for a congestion of the link; and b) detecting when the load exceeds one of a plurality of thresholds each threshold indicative for a level of congestion on the link; and c) sending a signal to another device in the network signalling the level of congestion.

According to a sixth aspect, the disclosure relates to a computer program product comprising a computer-executable instructions for performing the method according to the fourth or fifth aspect when the program is run on a computer.

According to a seventh aspect, the disclosure relates to a computer readable storage medium comprising the computer program product according to the sixth aspect.

According to an eighth aspect, the disclosure relates to a data processing system programmed for carrying out the method according to the fourth or fifth aspect.

DETAILED DESCRIPTION OF EMBODIMENT(S)

Figure 1:
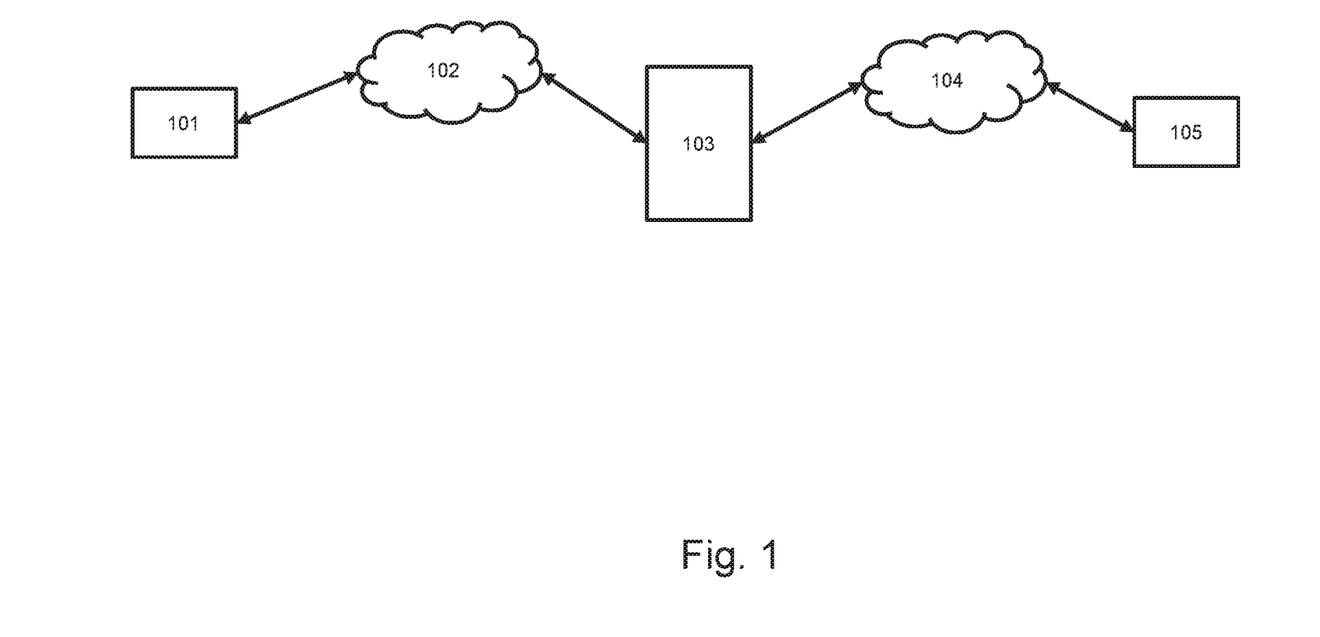
FIG. 1 schematically illustrates a link in a communication network comprising an endpoint and forwarding device according to an embodiment.

According to an embodiment, the present disclosure relates to a packet forwarding device for forwarding packets on a link within a communication network. FIG. 1 is an illustration of such a communication network. In the communication network a networking endpoint 101 sends data packets to the destination endpoint 105, wherein a packet forwarding device such as 103 will receive the data packets from the endpoint 101 via the link 102 and will send them forward to the destination endpoint 105 through the link 104. The packet forwarding device 103 may for example be a switch, a router or a gateway.

Figure 2:
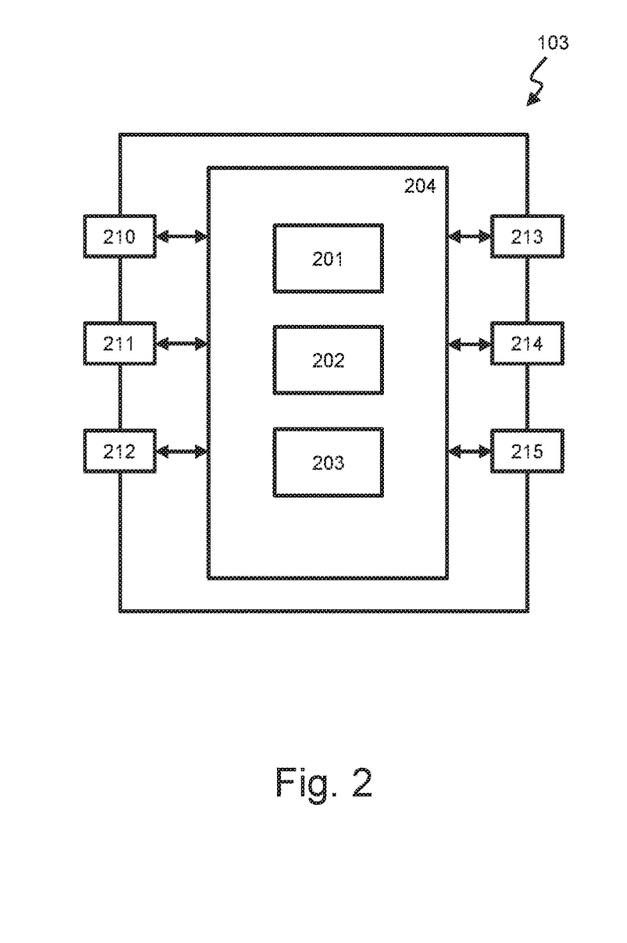
FIG. 2 schematically illustrates a packet forwarding device according to an embodiment.

The packet forwarding device 103 will in general be connected with different links for incoming as well as forwarding data packets. FIG. 2 is an illustration of such a packet forwarding device 103 according to an embodiment. Packet forwarding device 103 may receive packets over any of its networking interface 210 to 215 and forward the packets to any other of the networking interfaces 210 to 215. Forwarding module 204 determines how incoming packets should be forwarded and applies queueing or drops packets whenever needed.

Packet forwarding device 103 comprises a network monitoring module 201 that measures the load on a link, for example link 104 connected with a network interface 213, through which data packets need to be forwarded. The measured load will be indicative for a congestion of the link. Next, a congestion detection module 202 will detect if the measured load exceeds one of a plurality of thresholds, wherein each threshold is indicative for a level of congestion. Subsequently, according to an embodiment, congestion control module 203 sends a signal to another device, for example endpoint 105, in the communication network to signal the level of congestion. The signalling may be done by dropping the packet or by ECN marking. Endpoint 105 will then interpret the dropping and marking and forwards the signal to endpoint 101, for example by adding the congestion information in the header of an acknowledgement, ACK, packet.

Since the congestion control module 203 signals endpoint 101 regarding the level of congestion in the network, endpoint 101 will adapt the sending of data packets based hereupon.

Note that the load measured in a link may for example be presented as $\rho_l$, whereas the number of received packets for forwarding during a time interval $T_g$ may for example be presented by $M_l$. If $C_l$ is the capacity of the link, i.e. the maximum packets that the link can handle during the time interval $T_g$, the load may be expressed as $$\rho_l = M_l / C_l \cdot T_g \qquad \text{Eq. 1}$$

Figure 4:
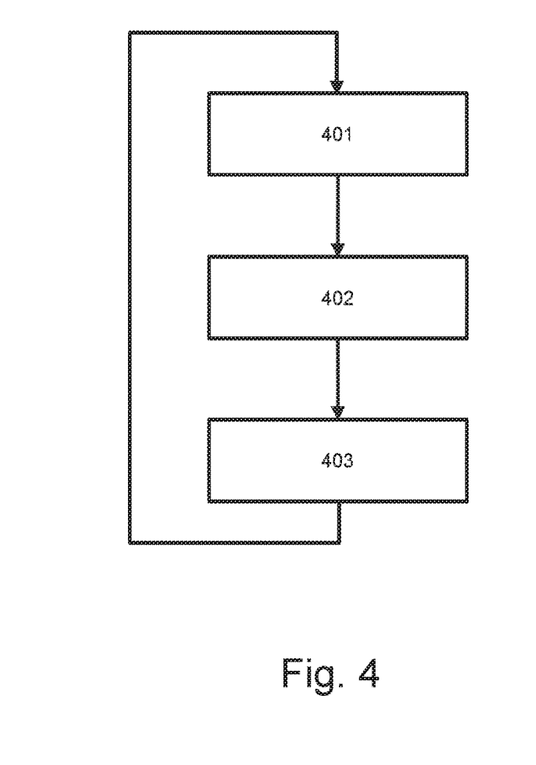
FIG. 4 illustrates steps performed by a networking endpoint for adapting a transmission of packets on a link in a networking endpoint according to an embodiment.

The steps performed by the platform of modules 204 belonging to the packet forwarding device 103 can also be presented schematically. FIG. 4 is an illustration of these steps.

The first step performed by the network monitor module 201 is to measure 401 the load. This load may for example be measured by estimating the received packets for forwarding, i.e. $M_l$ in Eq. 1, during a particular time interval, for example $T_g$. Since however the number of received packets during a particular time interval $T_g$ can fluctuate vastly on an even short time interval than $T_g$, such short-term fluctuations can result in a distorted estimation of the load. Hence, to better estimate the number of packets that are received a moving average may be calculated, for example an exponential weighted moving average. This will smooth out such short-term fluctuations and will highlight longer-term trends.

Figure 6:
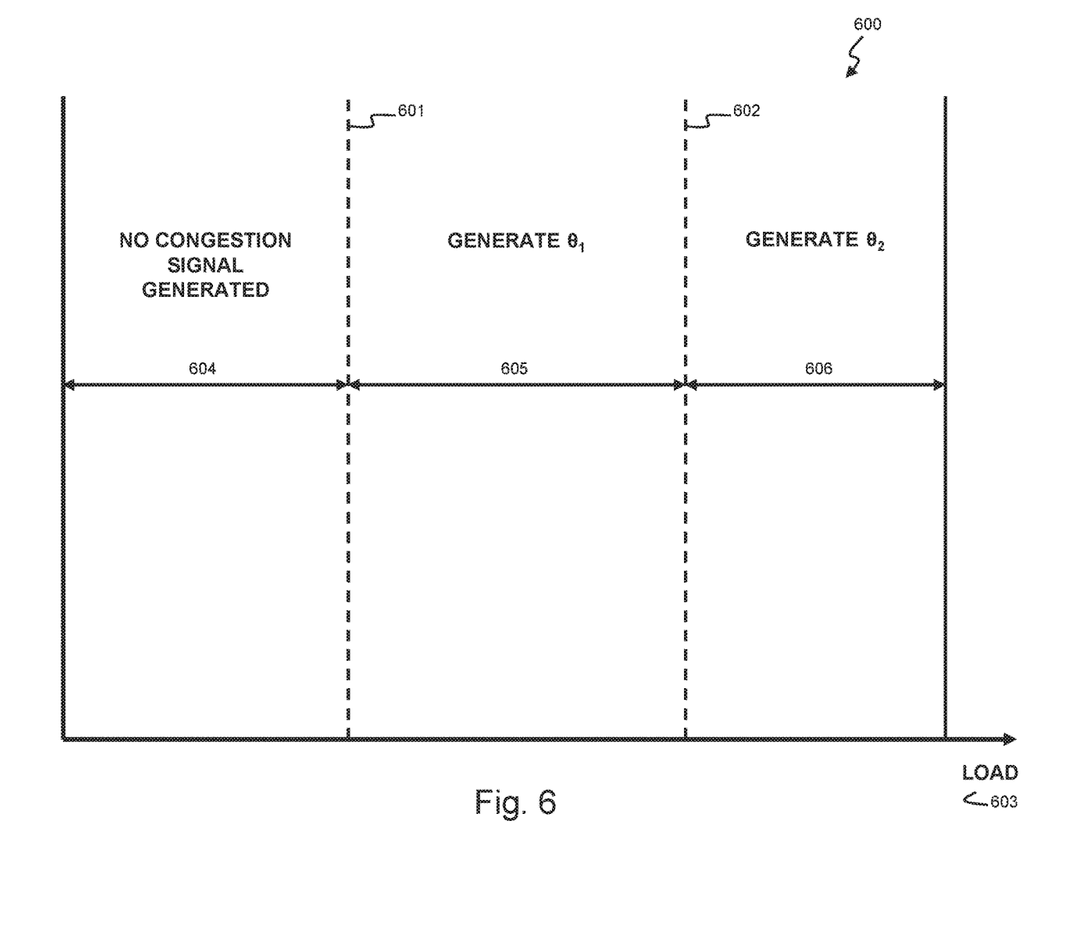
FIG. 6 shows a graph illustrating the generation of a double congestion signal according to an embodiment.

In the next step a congestion detection module 202 will detect 402 if this measured load, whether or not estimated by the use of an exponential weighted moving average, exceeds one of a plurality of thresholds. This is further illustrated by two thresholds but different embodiments with more thresholds may be used in a similar way. FIG. 6 gives an illustration therefrom. In FIG. 6 a graph 600 illustrates the load 603, presented on the X-axis, as measured by the network monitor module 201 in step 401. Regarding the load 603, two thresholds are defined, namely 601 and 602. Each threshold is indicative for a level of congestion. Subsequently, in the next step, congestion control module 203 sends 403 a signal to another device, for example 101, in the network signalling the level of congestion which is derived from an exceeding of a threshold.

Thus, as illustrated in FIG. 6, if two thresholds 601, 602 are defined, three situations 604, 605 and 606 may be distinguished. At first, if the load 603 does not exceed the first threshold 601, no congestion signal is generated 604. If, secondly, the load 603 increases and exceeds the first threshold 601, a first signal is generated 605. This signal may be presented as for example $\theta_1$. In a third condition 606, namely if the load increased even more and exceeds the second threshold 602, another signal is generated and is presented as $\theta_2$.

According to an embodiment of the present disclosure, one of the signals $\theta_1$ or $\theta_2$, which may for example be encoded in a header file, are send 403 to another device in the network by the congestion control module 203. This signal may be send by for example embedding it in a header file of the packets, wherein the header file can for example correspond to an explicit congestion notification (ECN) field of an Internet Protocol header.

Finally, steps 401, 402 and 403 in FIG. 4 may be repeated continuously such that the load is continuously monitored.

Figure 3:
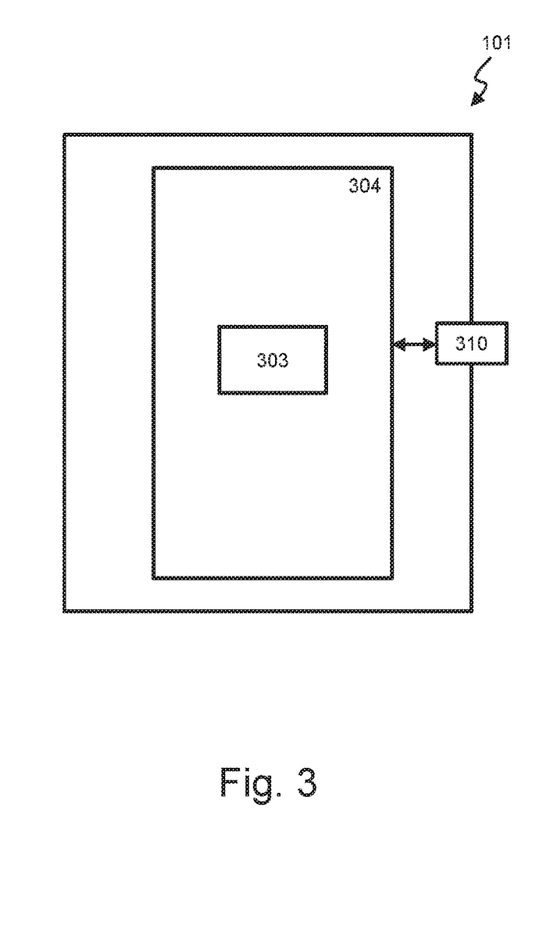
FIG. 3 illustrates a networking endpoint comprising a source congestion control module according to an embodiment.

FIG. 3 illustrates a detailed view of the networking endpoint 101 according to an embodiment of the disclosure. Endpoint 101 may correspond to any networking device having networking source capabilities, i.e., a device that functions as a source of a data flow such as for example a video stream, an audio stream or any other data flow which is part of a data connection between two networking devices. Endpoint 101 comprises a networking stack 304 coupled to a networking device for reception and transmission of data packets over the networking link.

Figure 5:
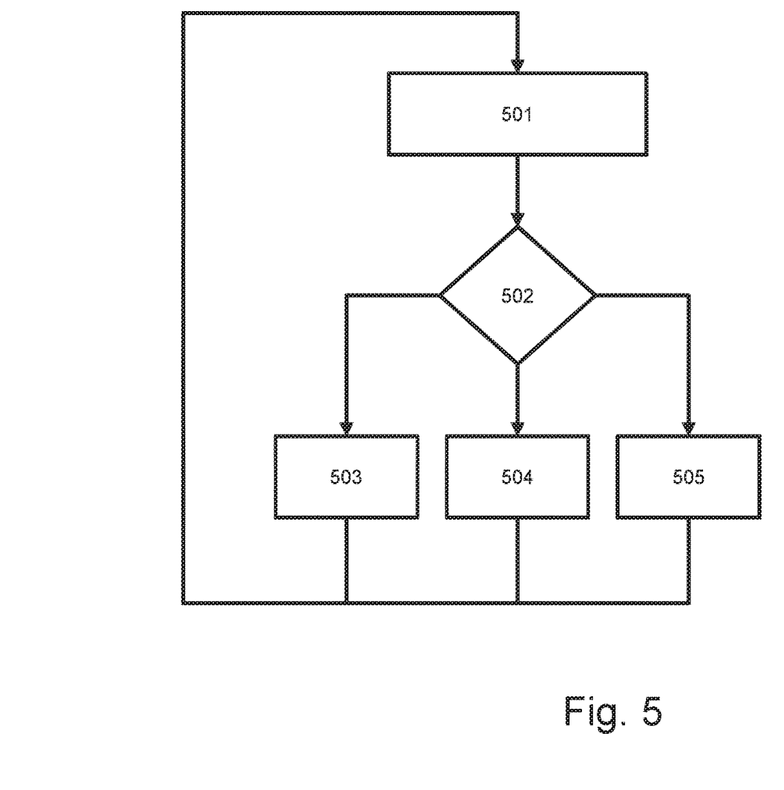
FIG. 5 schematically illustrates steps performed by a packet forwarding device according to an embodiment.

Endpoint 101 receives the congestion signals over networking interface 310 and networking stack 304 and use them in the congestion control module 303 to control the transmission of future packets in order to avoid further congestion of the link. FIG. 5 illustrates steps performed by the congestion control module 303 in order to avoid congestion on the link.

In step 501, congestion control module 303 receives a packet on the networking interface. In step 502, the module checks whether the packet comprises a congestion signal from a packet forwarding device present in the network link, for example from packet forwarding device 103. This congestion signal comprises information indicating the level congestion on the network link as described above. As an example, the embodiment will further be described for a congestion signal that indicates two levels of congestion 605 and 606 as described above with reference to FIG. 6. When no congestion signal is received, congestion detection module assumes that no congestion appears on the network link and proceeds to step 503. When a congestion signal indicating congestion level 605 is received, a first low level 605 of congestion is assumed and module 303 proceeds to step 504. When a congestion signal indicating congestion level 606 is received, a second high level 606 of congestion is assumed and module 303 proceeds to step 505.

In step 503, when there is no network congestion, module 303 probes for the available bandwidth according to a first probing scheme. As no congestion is assumed the probing may be performed aggressively, for example by a slow start or additive increase. In step 504, when there is first low level 605 of congestion in the network, the module 303 probes for the available bandwidth according to a second probing scheme which is slower or less aggressive than the first probing scheme. The second probing scheme may for example slow down the probing by using non-linear probing. The actual level of aggressiveness in the second probing scheme may further be adapted depending on the actual indicated congestion level. In step 505, when there is a second higher level 606 of congestion, a back-off probing scheme is used, i.e., the data rate of packets on the link is reduced. When the probing scheme has been adapted according to steps 503, 504 or 505, the module returns to step 501 until it receives the next congestion signal.

According to a further embodiment, the probing scheme may be implemented by changing the TCP window size, i.e., increasing it when applying the first and second probing scheme and decreasing it when applying the third probing scheme. An increase of the window size may be performed according to the following equation:

$$w_{t+RTT} \leftarrow w_t + \frac{\alpha}{w_t^k}$$

wherein
- β is a parameter chosen greater than zero;
- $w_t$ is the window size at a certain point in time t;
- $w_{t+RTT}$ is the updated window size applied after a time interval RTT;
- RTT is the round-trip time;
- k corresponds to the aggressiveness of the bandwidth probing and is chosen greater than zero.

A decrease of the window size may be performed according to the following equation:

$$w_{t+\delta} \leftarrow w_t \leftarrow -\beta w_t$$

wherein
- α is a parameter chosen greater than zero;
- 0<β<1;
- $w_t$ is the window size at a certain point in time t;
- $w_{t+\delta}$ is the updated window size applied after a time interval δ;
- δ is the time to detect a congestion signal since the last window update.

The above control functions for increasing and decreasing the window size correspond to an integral controller, where the congestion signal observed at an end-point is used to determine the derivative of the transmission window, i.e., $dw_t/dt = \alpha/w_t^k$ for the increase rule and $dw_t/=-\beta w_t$ for the decrease rule. The different forms of $dw_t/dt$ indicates the different types of probing schemes. For instance, TCP Reno and DCTCP set k=0 such that the window is increased linearly by α after each RTT (usually α=1). According to the above embodiment, k>0, so that the equation for increasing the window size reduces to the class of non-linear window increment schemes. These schemes behaves less aggressive during bandwidth probing and, thus, leads to less oscillation at the endpoint. This also results to less oscillations in throughput in a bottleneck link.

One drawback of having a less oscillating source is the increased convergence time to fairness, e.g., flows enabled with DCTCP/HULL experience longer convergence speed as it reduces the window size depends on the level of congestion than halving the window (β=½) as in TCP Reno. The same problem may occur if the amplitude of window increment is reduced (k>0). This trade-off between smoothness and convergence is solved by the plurality of congestion thresholds 601, 602. Because of this, the endpoint 101 adapts its aggressiveness during bandwidth probing based on the type of congestion signals being received.

According to an alternative embodiment, the probing scheme may be implemented by implementing the probing scheme based on the transmission rate of the data packets, i.e., by increasing or decreasing the data rate. This may be done by converting the above equations with the relation $r_i = w_i/RTT$ where $r_i$ corresponds to the transmission rate. This way, the window-based probing scheme may be changed to a rate-based probing scheme.

Figure 7:
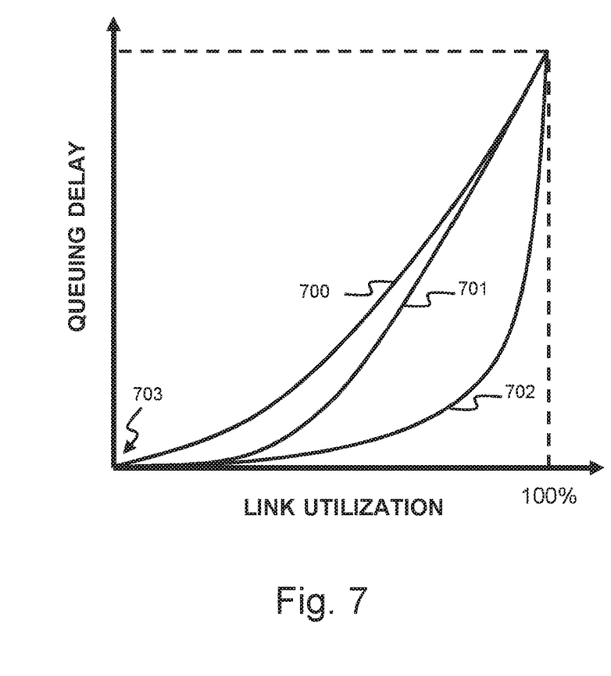
FIG. 7 shows an illustrative example of a trade-off between zero-queuing delay and high-throughput.

According to an embodiment of the present disclosure, FIG. 7 illustrates an advantage of using a plurality of thresholds regarding to a load in a link in order to reduce queue oscillations and minimize latency. If the link utilization is presented in relation to queuing delay in the same link, it is an objective to minimize queue delaying as much as possible. If the link is not used, obviously there is no queuing delay. This state is presented by point 703. If the link is used and hence the link utilization increased, the queuing delay will increase as well. The graphs 700, 701 and 702 show different results for different congestion prevention mechanisms. Graph 700 corresponds to the TCP-based AQM mechanism as known in the art, graph 701 corresponds to the HULL mechanism as known in the art. Graph 702 shows the results when the steps for congestion control according to embodiments of the disclosure are used.

Figure 8:
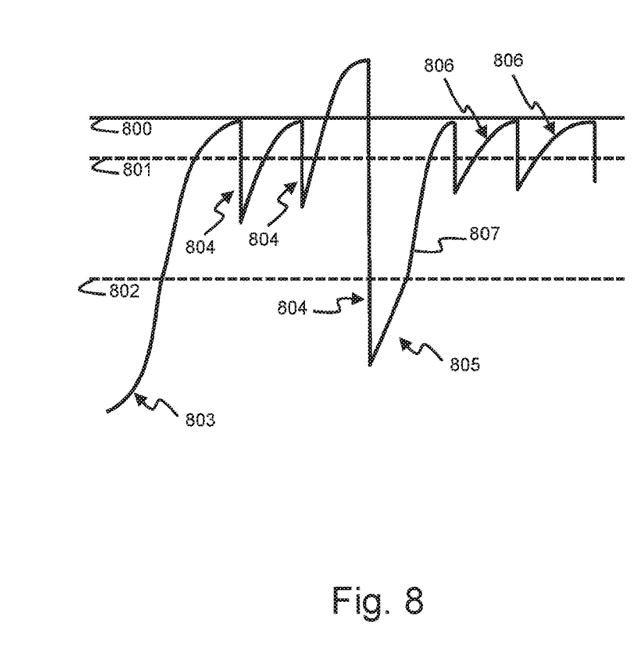
FIG. 8 shows a graph illustrating the throughput data packets according to different congestions signals.

FIG. 8 illustrates the throughput at endpoint 101 for the case where two thresholds 801 and 802 are used. The maximum capacity that endpoint 101 can share on a link is presented by 800. The graph 807 corresponds to the change of window size or rate at endpoint 101. At the start 803, when no congestion signal is received at endpoint 101, the window/rate increases aggressively with a slow-start or through additive increase to level 802. When the first threshold 802 is exceeded, the window/rate has a non-linear increment 806. If a second congestion signal is received at endpoint 101, the window/rate will fall back 804, after which the window/rate may increase additively 805.

Figure 9:
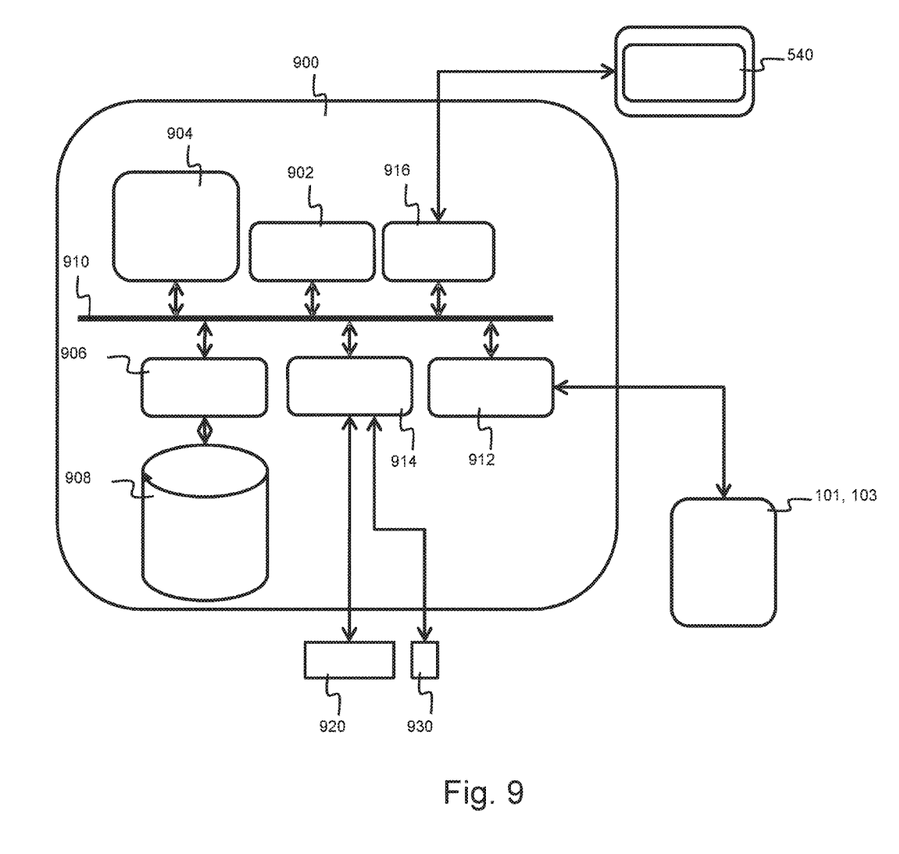
FIG. 9 illustrates a suitable computing system for the networking endpoint and packet forwarding device according to an embodiment of the disclosure.

FIG. 9 shows a suitable computing system 900 for performing the steps according to the above embodiments. Computing system 900 may be used as endpoint 101 or packet forwarding device 103. Computing system 900 may in general be formed as a suitable general purpose computer and comprise a bus 910, a processor 902, a local memory 904, one or more optional input interfaces 914, one or more optional output interfaces 916, a communication interface 912, a storage element interface 906 and one or more storage elements 908. Bus 910 may comprise one or more conductors that permit communication among the components of the computing system 900. Processor 902 may include any type of conventional processor or microprocessor that interprets and executes programming instructions. Local memory 904 may include a random access memory (RAM) or another type of dynamic storage device that stores information and instructions for execution by processor 902 and/or a read only memory (ROM) or another type of static storage device that stores static information and instructions for use by processor 902. Input interface 914 may comprise one or more conventional mechanisms that permit an operator to input information to the computing device 900, such as a keyboard 920, a mouse 930, a pen, voice recognition and/or biometric mechanisms, etc. Output interface 916 may comprise one or more conventional mechanisms that output information to the operator, such as a display 940, etc. Communication interface 912 may comprise any transceiver-like mechanism such as for example one or more Ethernet interfaces that enables computing system 900 to communicate with other devices and/or systems 960. The communication interface 912 of computing system 900 may be connected to such another computing system by means of a local area network (LAN) or a wide area network (WAN) such as for example the Internet. Communication interface 912 may correspond to networking interfaces 210-215 or 310. Storage element interface 906 may comprise a storage interface such as for example a Serial Advanced Technology Attachment (SATA) interface or a Small Computer System Interface (SCSI) for connecting bus 910 to one or more storage elements 908, such as one or more local disks, for example SATA disk drives, and control the reading and writing of data to and/or from these storage elements 908. Although the storage elements 908 above is described as a local disk, in general any other suitable computer-readable media such as a removable magnetic disk, optical storage media such as a CD or DVD, -ROM disk, solid state drives, flash memory cards, . . . could be used. The system 900 described above can also run as a virtual machine above the physical hardware.

Although the present disclosure has been illustrated by reference to specific embodiments, it will be apparent to those skilled in the art that the disclosure is not limited to the details of the foregoing illustrative embodiments, and that the present disclosure may be embodied with various changes and modifications without departing from the scope thereof. The present embodiments are therefore to be considered in all respects as illustrative and not restrictive, the scope of the disclosure being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", "third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the disclosure are capable of operating according to the present disclosure in other sequences, or in orientations different from the one(s) described or illustrated above.

The invention claimed is:

1. A packet forwarding device for forwarding packets on a link within a communication network, the device comprising:
    at least one memory configured to store computer-readable instructions; and
    at least one processor configured to execute the computer-readable instructions to cause the packet forwarding device to
    measure a load indicative of a congestion of the link; and
    whether the load exceeds one of a plurality of thresholds, the plurality of thresholds including at least a first threshold indicative of a first level of congestion on the link and a second threshold indicative of a second level of congestion on the link that is higher than the first level of congestion;
    in response to detecting the first threshold is exceeded, send a first congestion signal to an endpoint device in the communication network signalling the first level of congestion, the first congestion signal causing the endpoint device to probe available bandwidth according to a probing scheme that is less aggressive than a probing scheme used when the link is not congested; and
    in response to detecting the second threshold is exceeded, send a second congestion signal to the endpoint device in the communication network signalling the second level of congestion, the second congestion signal causing the endpoint device to probe the available bandwidth according to a back-off probing scheme.

2. The packet forwarding device according to claim 1, wherein the load is a ratio of a number of received packets for forwarding on the link over a maximum number of packets that the link can handle.

3. The packet forwarding device according to claim 2, wherein the at least one processor is configured to execute the computer-readable instructions to cause the packet forwarding device to measure the load according to an exponential weighted moving average.

4. The packet forwarding device according to claim 1, wherein the at least one processor is configured to execute the computer-readable instructions to cause the packet forwarding device to change the plurality of thresholds dependent on network conditions.

5. The packet forwarding device according to claim 1, wherein the first congestion signal or the second congestion signal is embedded in a header field of the packets.

6. The packet forwarding device according to claim 5, wherein the header field corresponds to an explicit congestion notification (ECN) field of an Internet Protocol header.

7. A networking endpoint comprising:
    at least one memory storing computer-readable instructions; and
    at least one processor configured to execute the computer-readable instructions to cause the networking endpoint to adapt a transmission of packets on a link according to a congestion signal received from a packet forwarding device on the link, wherein the congestion signal is indicative of a congestion level selected from a plurality of congestion levels, and adapting the transmission of packets on the link according to the congestion signal includes in response to no congestion signal being received, probing an available bandwidth according to a first probing scheme;

in response to receiving a first congestion signal corresponding to a first level of congestion, probing the available bandwidth according to a second probing scheme, wherein the second probing scheme is less aggressive than the first probing scheme; and in response to receiving a second congestion signal corresponding to a second level of congestion that is higher than the first level of congestion, probing the available bandwidth according to a third probing scheme that is different than the second probing scheme, wherein the third probing scheme is a back-off probing scheme.

8. The networking endpoint according to claim 7, wherein the networking endpoint further operates according to a window-based probing scheme or a rate-based probing scheme.

9. A method for adapting a transmission of packets on a link in a networking endpoint according to a congestion signal received from a packet forwarding device on the link, wherein the congestion signal is indicative of a congestion level selected from a plurality of congestion levels, and the adapting of the transmission of packets on the link according to the congestion signal comprises:

in response to no congestion signal being received, probing an available bandwidth according to a first probing scheme;

in response to receiving a first congestion signal corresponding to a first level of congestion, probing the available bandwidth according to a second probing scheme, wherein the second probing scheme is less aggressive than the first probing scheme; and in response to receiving a second congestion signal corresponding to a second level of congestion that is higher than the first level of congestion, probing the available bandwidth according to a third probing scheme that is different than the second probing scheme, wherein the third probing scheme is a back-off probing scheme.

10. A method for forwarding packets on a link within a communication network, the method comprising:

measuring a load indicative of a congestion of the link;

detecting whether the load exceeds one of a plurality of thresholds, the plurality of thresholds including at least a first threshold indicative of a first level of congestion on the link and a second threshold indicative of a second level of congestion on the link that is higher than the first level of congestion;

in response to detecting the first threshold is exceeded, sending a first congestion signal to an endpoint device in the communication network signalling the first level of congestion, the first congestion signal causing the endpoint device to probe available bandwidth according to a probing scheme that is less aggressive than a probing scheme used when the link is not congested; and in response to detecting the second threshold is exceeded, sending a second congestion signal to the endpoint device in the communication network signalling the second level of congestion, the second congestion signal causing the endpoint device to probe the available bandwidth according to a back-off probing scheme.

11. A non-transitory computer readable medium storing a program of computer-executable instructions for performing the method according to claim 9 when the program is run on a computer.

12. A data processing system programmed for carrying out the method according to claim 9.

\* \* \* \* \*